(12) United States Patent
Holt et al.

(10) Patent No.: US 6,563,048 B2
(45) Date of Patent: May 13, 2003

(54) ANCILLARY CABINET SYSTEM FOR AN UNINTERRUPTIBLE POWER SUPPLY

(75) Inventors: David Holt, Cols, OH (US); Kenneth M. Wagner, Delaware, OH (US); James K. Martin, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 10/003,701

(22) Filed: Oct. 24, 2001

(65) Prior Publication Data

US 2002/0084089 A1 Jul. 4, 2002

Related U.S. Application Data

(60) Provisional application No. 60/244,004, filed on Oct. 27, 2000.

(51) Int. Cl.[7] .................................................. H02G 3/14
(52) U.S. Cl. ........................................ 174/50; 220/4.02
(58) Field of Search ............................ 174/50, 58, 63, 174/60, 65 R, 135; 220/4.02, 3.6, 3.8, 3.3; 248/906; 439/535

(56) References Cited

U.S. PATENT DOCUMENTS

| | | | | |
|---|---|---|---|---|
| 2,028,509 A | * | 1/1936 | Konell ...................... 220/3.94 |
| 4,890,318 A | * | 12/1989 | Crane et al. ........... 174/65 R X |
| 5,272,279 A | * | 12/1993 | Filshie ........................ 174/50 |
| 5,747,734 A | * | 5/1998 | Kozlowski et al. ........... 174/50 |
| 6,356,434 B1 | * | 3/2002 | Osterman .................... 361/641 |
| 6,395,981 B1 | * | 5/2002 | Ford et al. .................... 174/50 |
| 6,420,650 B2 | * | 7/2002 | Behr ............................ 174/50 |

* cited by examiner

*Primary Examiner*—Dean A. Reichard
*Assistant Examiner*—Dhiru R Patel
(74) *Attorney, Agent, or Firm*—Howrey Simon Arnold and White, LLP

(57) ABSTRACT

A system of ancillary cabinet for use with an uninterruptible power source (UPS) is disclosed. The ancillary cabinets have modular and reversible features that facilitate the installation of an uninterruptible power supply. The frames for the ancillary cabinets use a galvanized riveted frame design. The frames use pop rivets to allow the units to be shipped flat and assembled easily in the field. The overall size of the ancillary cabinets are consistent with the dimensions of a UPS cabinet. Specifically, the depth and height of the ancillary cabinets match the UPS. Also, the overall cabinet design matches the style, color, and texture of the UPS cabinet. The ancillary cabinets may be bolted to each other and/or the UPS cabinet to form a specific UPS system. The cabinets are serviceable by front access. An inter-cabinet wiring trough (wiring access) in the ancillary cabinets matches up with the UPS.

28 Claims, 11 Drawing Sheets

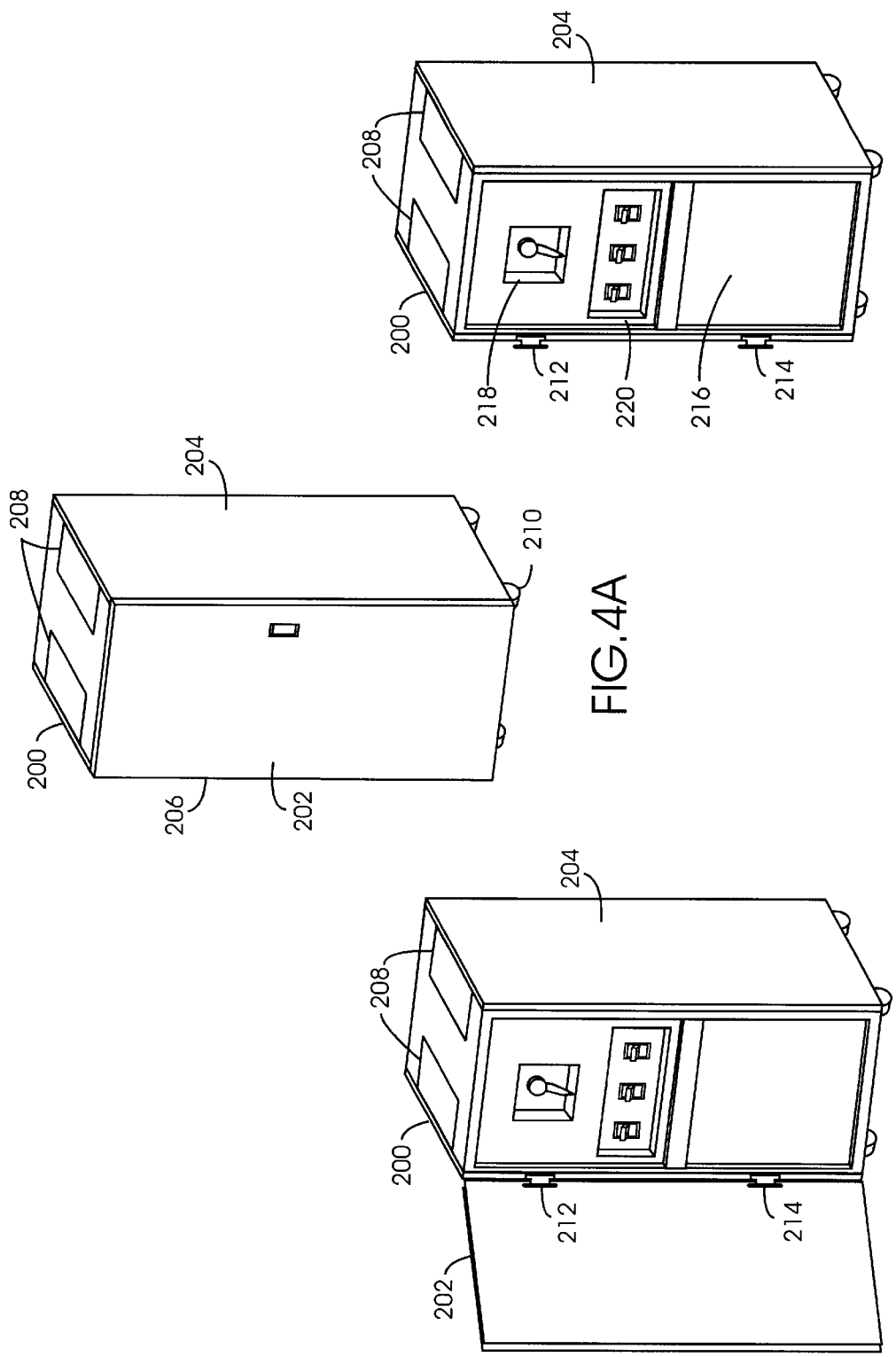

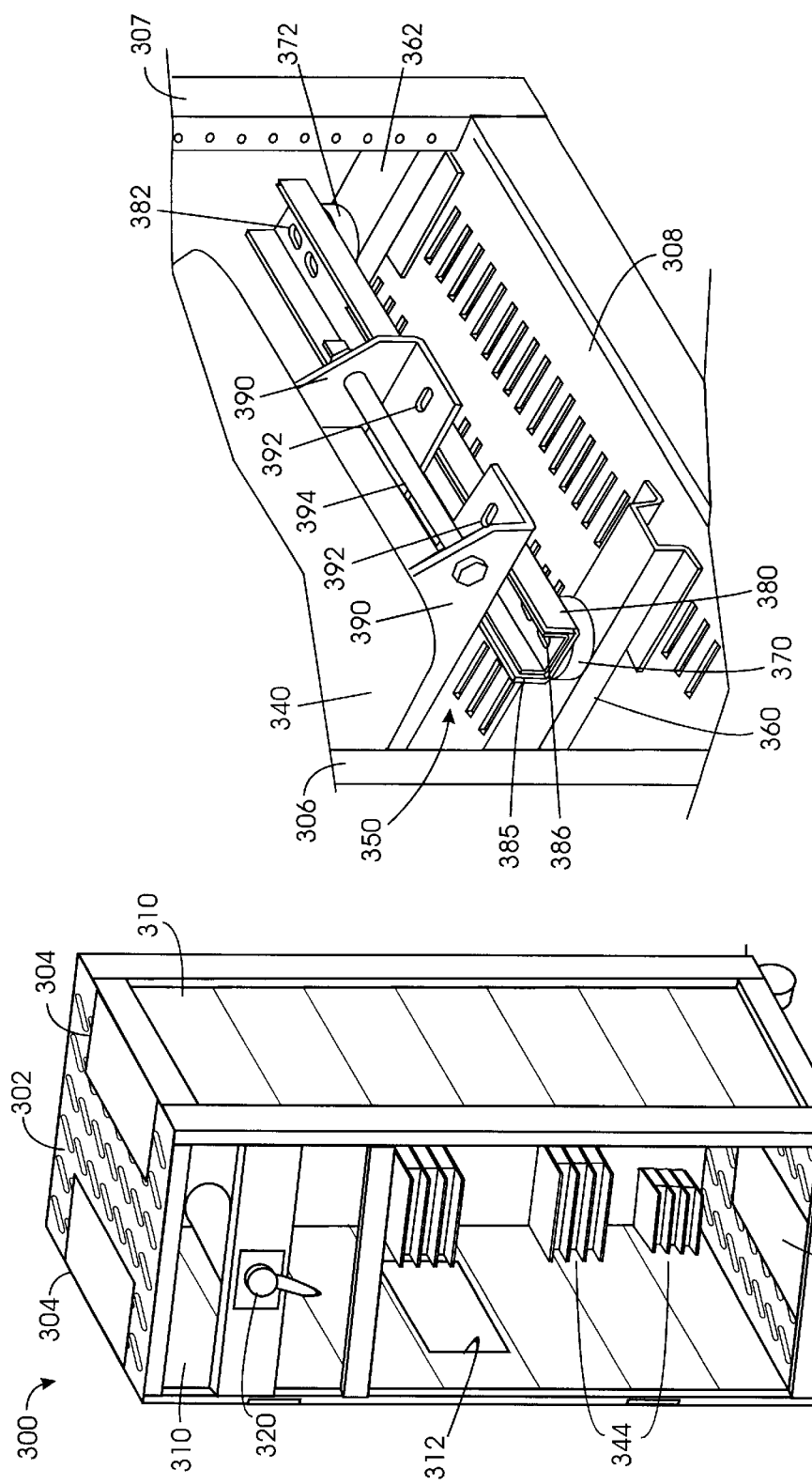

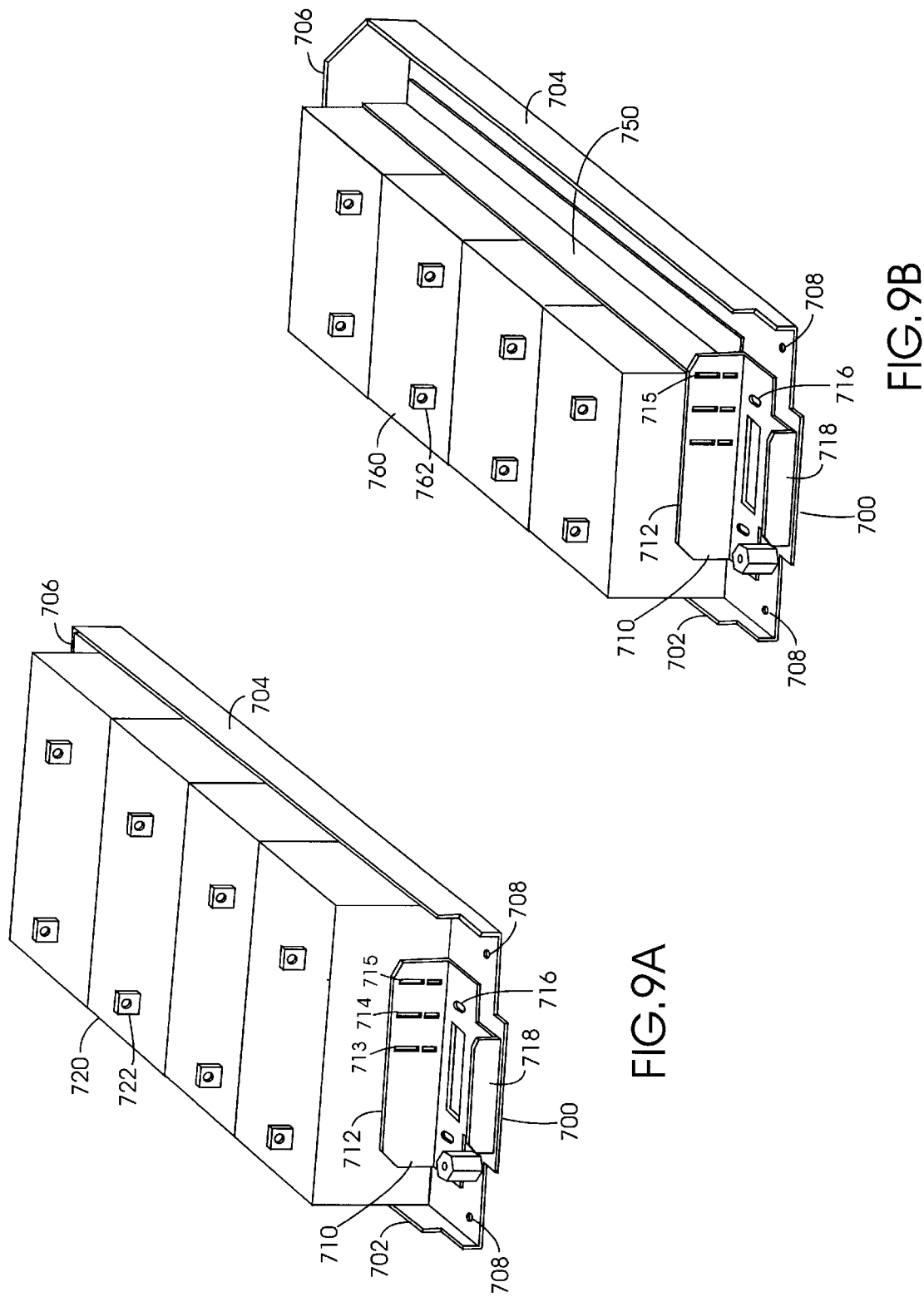

ANCILLARY CABINET SYSTEM FOR AN UNINTERRUPTIBLE POWER SUPPLY

CROSS-REFERENCE TO RELATED APPLICATIONS

This application claims the benefit of the Provisional Application Serial No. 60/244,004 filed Oct. 27, 2000.

FIELD OF THE INVENTION

The present invention relates generally to an uninterruptible power supply (UPS) and, more particularly to a system of ancillary cabinets for use with an uninterruptible power supply.

BACKGROUND OF THE INVENTION

AC commercial power is used as a primary power source for computers and other data processing equipment that in turn use stored program and solid state technology. These circuits are generally very sensitive to input power variations from a desired standard waveform. However, commercial AC power waveforms are subject to many variations due to the demands of other users on the power line and other factors. Typical undesirable variations are over-voltage, under-voltage, voltage outages, and signal transients. Undesirable variations also occur due to load conditions, and line conditions.

An uninterruptible power supply typically has a variety of systems. The UPS uses a battery backup as a secondary or reserve power source which is activated to supply power to the load upon total failure of the commercial power or significant degradation of the primary power source. A battery system includes one or more battery cabinets. The batteries supply a DC power source needed to operate the UPS for a specified time. The battery cabinets hold a number of series and/or parallel connected batteries. The batteries require maintenance and cleaning from time to time. The maintenance is performed off-line and involves the cleaning of terminals, applying anti-oxide compounds, and retorquing the battery connections. Monitoring hardware or cables may also be replaced.

Maintenance of the numerous batteries in a battery cabinet may be a cumbersome procedure. Conventional battery cabinets provide direct access to the batteries, but as a consequence, such cabinets are unable to hold numerous battery cells due to space constraints imposed by regulatory safety requirements. Battery cabinets also employ sets of drawers for accessing the batteries. The drawers require a significant amount of structure and manufacture to implement in a cabinet. A need exists for battery cabinets that provide easy off-line and on-line access to the batteries, that require a minimum of structure and manufacture, and that hold numerous batteries.

An uninterruptible power supply also includes distribution systems and maintenance bypass systems. Distribution systems are used to properly route wiring and provide circuit breakers. Service personnel use maintenance bypass systems to shut down the UPS for maintenance. The maintenance bypass system typically includes a bypass switch and bypass circuit breakers.

With present trends, businesses require more computer and data equipment. More equipment is being placed in more restrictive environments and computer rooms. Installing UPS systems requires a great deal of planning and design. In conventional UPS systems, specific arrangements of cabinetry, doors, panels, and the like must be ordered and specified in advance of manufacture. For example, whether a door opens from left or right hand hinges must be predetermined when ordering equipment. Due to improperly ordered or shipped equipment and unexpected changes in the field, installation in the field of the UPS system can be greatly hindered.

The present invention is directed to overcoming, or at least reducing the effects of, one or more of the problems set forth above.

SUMMARY OF THE INVENTION

In view of the foregoing and other considerations, the present invention relates to a system of ancillary cabinet for use with an uninterruptible power supply.

In accordance with one aspect of the present invention, there is provided a system of ancillary cabinets having an UPS cabinet providing an uninterruptible power supply and having a wiring trough. A maintenance bypass cabinet allows shutdown of the UPS during maintenance procedures and is attachable to the UPS cabinet. A distribution cabinet distributes the power of the UPS cabinet and is attachable to the UPS cabinet or the maintenance bypass cabinet. A battery cabinet supplies power to the UPS cabinet. The battery cabinet is attachable to the UPS cabinet or the maintenance bypass cabinet. There is provided an inter-cabinet wiring trough in the ancillary cabinets that matches the wiring trough in the UPS cabinet. The depth and height of the ancillary cabinets match the depth and height of the UPS cabinet. Each of the cabinets is serviceable by front access has a reversible and removable door.

BRIEF DESCRIPTION OF THE DRAWINGS

The foregoing, preferred embodiment and other aspects of the present invention will be best understood with reference to a detailed description of specific embodiments of the invention, which follows, when read in conjunction with the accompanying drawings, in which:

FIGS. 4A–C illustrate a bypass maintenance cabinet according to the present invention.

FIGS. 5A–D illustrate additional embodiments of a bypass maintenance cabinet according to the present invention.

FIGS. 9A–B illustrate embodiments of a service tray holding batteries of various sizes.

Figure 2:
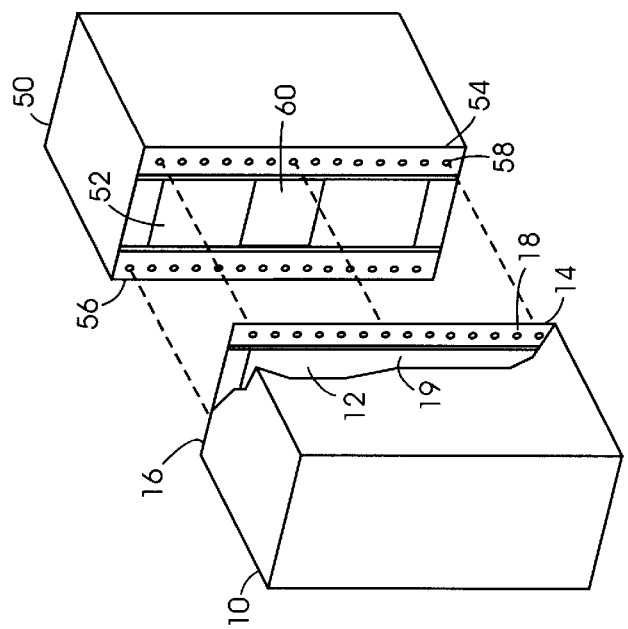
FIG. 2 illustrates attachment of the maintenance bypass cabinet to the UPS cabinet.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents, and alternatives falling within the scope of the invention as defined by the appended claims.

DETAILED DESCRIPTION OF THE INVENTION

Figure 1:
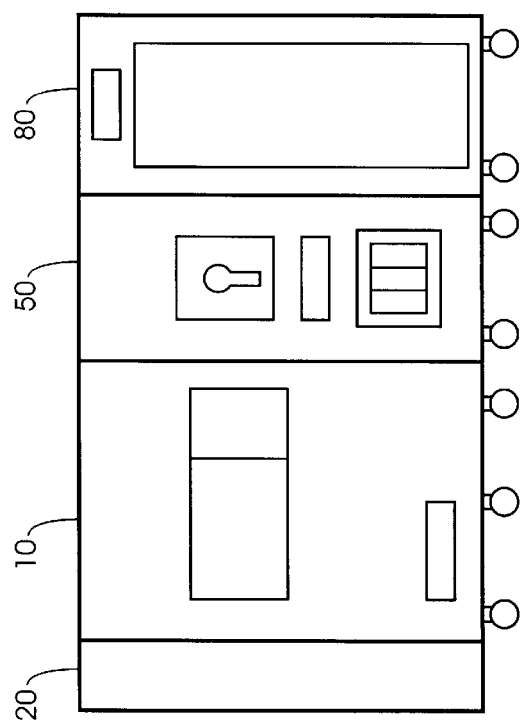
FIG. 1 illustrates an exemplary arrangement of ancillary cabinets for an uninterruptible power supply according to the present invention.

FIG. 1 illustrates a system of ancillary cabinets for an uninterruptible power supply (UPS) according to the present invention. UPS cabinet 10 for an uninterruptible power supply is provided. UPS cabinet 10 contains transformers, electronic hardware, inverters and rectifiers for providing a power supply to a computer system or network when a regular power source is interrupted. A distribution cabinet 20 attaches to a side of UPS cabinet 10. Distribution cabinet 20 has the same dimensions as the side of the UPS cabinet 10 and is configured to attach to either side of the UPS cabinet. Distribution cabinet 10 may also attach to either side of maintenance bypass cabinet 50.

A maintenance bypass cabinet 50 attaches to UPS cabinet 10. Maintenance bypass cabinet 50 includes a bypass rotary switch and circuit breakers. Larger maintenance bypass cabinets may also include transformers. Maintenance bypass cabinet 50 mounts to either side of UPS cabinet 10.

Lastly, a battery cabinet 80 attaches to the maintenance bypass cabinet 50. Battery cabinet 80 mounts to either side of UPS cabinet 80 or mounts remotely. Battery cabinets are not typically separated from other battery cabinets in the line-up of cabinets. Battery cabinet 80 may supply DC power to the UPS from 30–130 kVA and may include motor operated breakers for auto restart.

The system of ancillary cabinets and UPS in FIG. 1 represents one possible arrangement of cabinets for providing an uninterruptible power supply. Specific arrangements for a particular installation may vary. To meet the trends of the business and computer industries, the system of ancillary cabinets for the uninterruptible power supply according to the present invention incorporate modular and reversible features.

Some general modular and reversible features for the ancillary cabinets that facilitate the installation of an uninterruptible power supply will be described briefly. More specific features are provided in specific embodiments discussed later. The frames for the ancillary cabinets use a galvanized riveted frame design. The frames use pop rivets to allow the units to be shipped and stored flat, prior to assembly. The overall size of the ancillary cabinets is consistent with the dimensions of the UPS cabinet, making a uniform line-up of cabinets easy to form. Specifically, the depth and height of the ancillary cabinets match the UPS. Also, the overall cabinet design matches the style, color, and texture of the UPS cabinet. Panels on the cabinets cover the galvanized frame with a 2 mm allowed gap and are grounded for safety.

Importantly, the ancillary cabinets may be bolted to each other and/or the UPS cabinet to construct an UPS system with any of a number of possible configurations. Furthermore, the cabinets are serviceable by front access only. An inter-cabinet wiring trough (wiring access) in the ancillary cabinets matches up with the wiring trough of the UPS cabinet. All of the cabinets provide a floor clearance of 3⅛" so they may be lifted using standard pallet jacks. Casters on the cabinets are positioned for movement over ramps and across raised floors. In a preferred embodiment of the present invention, the casters have an arrangement such as disclosed in the Provisional Application Ser. No. 60/244,003 filed Oct. 27, 2000 and incorporated herein by reference.

FIG. 2 illustrates attachment of the maintenance bypass cabinet to the UPS cabinet. UPS cabinet 10 stands relative to maintenance bypass cabinet 50. UPS cabinet 10 is shown partially cut away to expose a side bulkhead 12 and corner posts 14 and 16. Corner posts 14, 16 have a plurality of boltholes 18 along their length.

A side panel has been removed from maintenance bypass cabinet 50, revealing a side bulkhead 52 and corner posts 54 and 56. Corner posts 54, 56 have a plurality of boltholes 58 along their length. Also, bulkhead 52 includes a wiring trough or conduit 60 in the side of the bulkhead. Wires (not shown) pass through wiring conduit 60 into UPS cabinet 10 that may have a complimentary wiring trough or conduit (not shown).

UPS cabinet 10 and maintenance bypass cabinet 50 have similar height and depth. Therefore, the plurality of boltholes 18 on corner posts 14, 16 align with the plurality of boltholes 58 on corner posts 54, 56. UPS cabinet 10 and maintenance bypass cabinet 50 situate adjacent to one another and bolts (not shown) attach the cabinets through the aligned boltholes 18, 58.

Figure 3B:
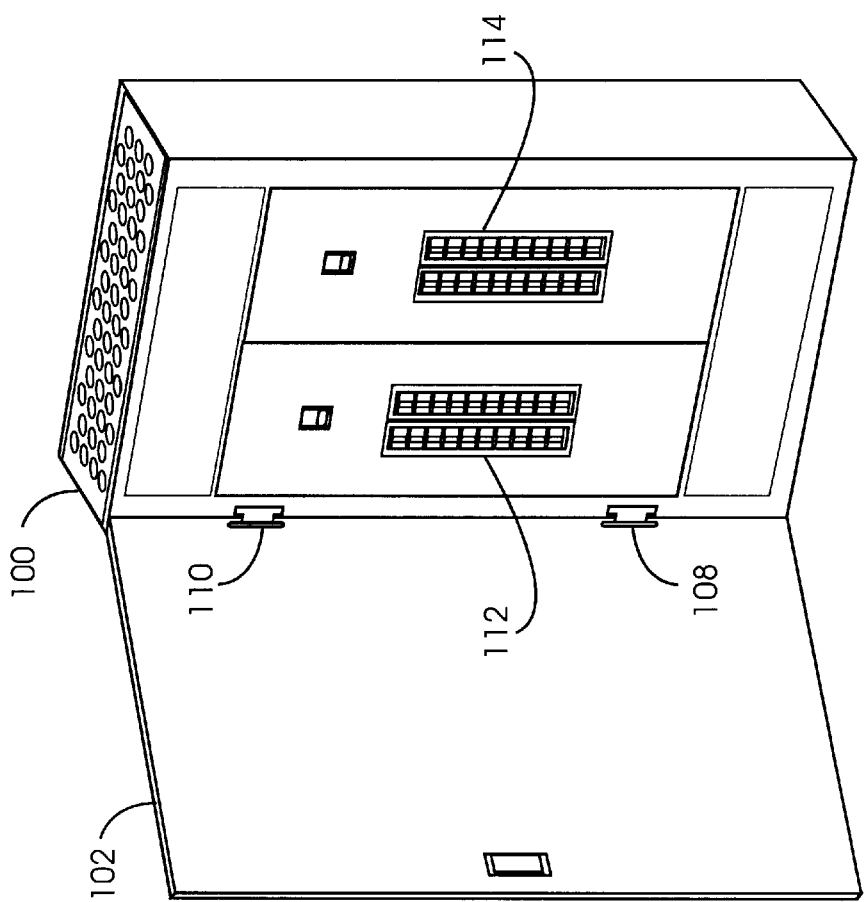
FIGS. 3A–D illustrate a distribution cabinet according to the present invention.
Figure 3A:
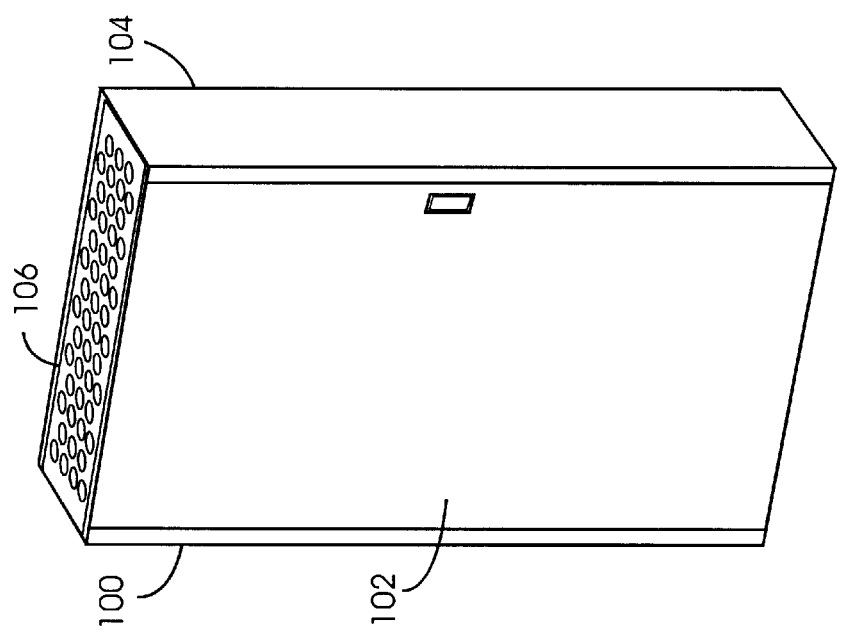

FIG. 3A illustrates an exemplary distribution cabinet 100 according to the present invention. Distribution cabinet 100 has a door 102 on one side. Distribution cabinet 100 attaches to the sides of the UPS cabinet or maintenance bypass cabinet at backside 104. A vented ceiling 106 allows heat to exit the cabinet.

FIG. 3B shows distribution cabinet 100 with door 102 open. Door 102 mounts to hinges 108 and 110 shown in a left-hand arrangement for FIG. 3B. The open door 102 reveals two sides 112, 114 of the distribution panel. The two sides 112, 114 allow for two panel boards, two main breakers, and four sub-feed breakers to be used in combination. Distribution cabinet 100 is symmetric and can be initially mounted upside down, left, or right in the field during installation. The mounting arrangement does not effect air induction capabilities of the distribution cabinet. Door 102 can also be reversed, allowing changes during installation in the field. Furthermore, door 102 encompasses the entire front of distribution cabinet 100 to simplify removal of the door for maintenance personnel.

Figure 3D:
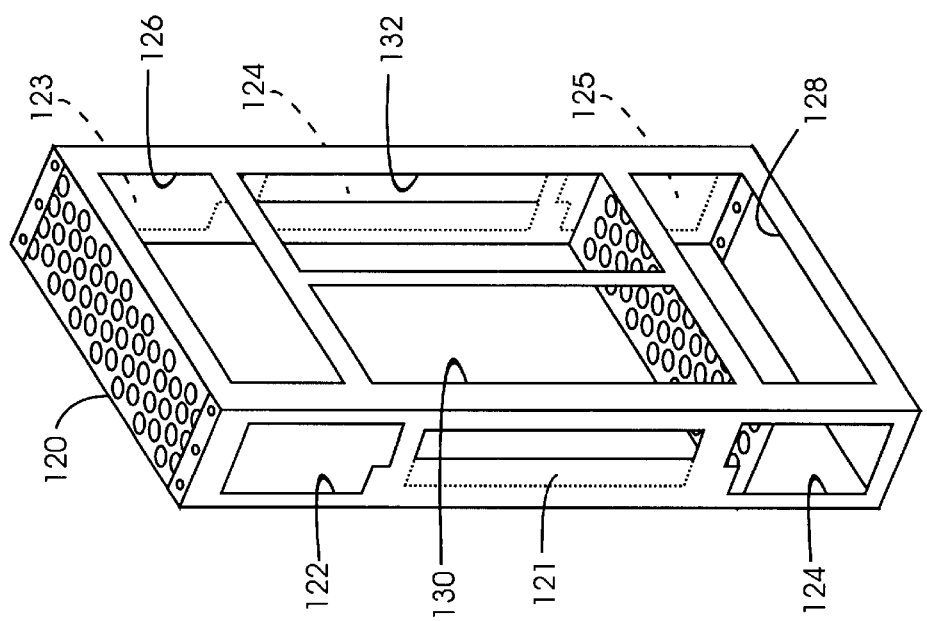
Figure 3C:
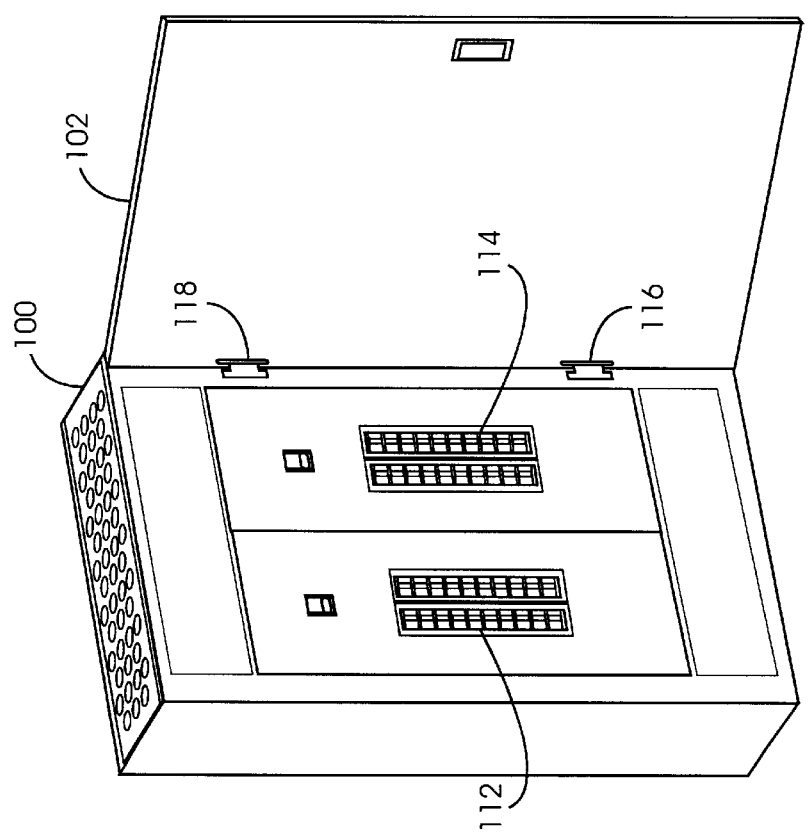

FIG. 3C shows distribution cabinet 100 with door 102 mounted in a right hand arrangement. Hinges 116, 118 may be set for right or left hand opening of the door depending on the installation requirements in the field. Door 102 may open to an angle of 120 degrees and can be removed during maintenance procedures. Door 102 lifts off upper ends of hinges 116, 118 while performing maintenance. In a preferred embodiment of the present invention, the hinges 116, 118 for use on the ancillary cabinets resemble hinges such as disclosed in the U.S. application Ser. No. 09/866,365 filed May 25, 2001 and incorporated herein by reference.

FIG. 3D shows a frame 120 for a distribution cabinet. Frame 120 is symmetrical and includes distribution openings 122, 124 on one side 121 of frame 120. Frame 120 has interchangeable top and bottom entry conduit plates 123, 125. Two conduit plates are supplied with the cabinet. The plates 123, 125 make frame 120 reversible in the field for top and bottom conduit entry.

The front of frame 120 has distribution chambers 126, 128 at ends of frame 120. Also in the front of frame 120 are two adjacent panel board openings 130, 132. Frame 120 may be constructed in an opposite arrangement. Specifically, distribution openings 122, 124 can be constructed on side 123 of frame 120, allowing the distribution cabinet to mount on an opposite side of the UPS or maintenance bypass cabinet (not shown).

FIGS. 4A–C illustrate a maintenance bypass cabinet according to the present invention. FIG. 4A illustrates bypass cabinet 200 having an access door 202. Maintenance bypass cabinet 200 has two sides 204, 206 for attachment to another cabinet. The panel covering the sides 204, 206 may be removed to reveal underlying bulkheads of the frame for attachment to another cabinet. The ceiling of cabinet 200 has top conduit plates 208 to provide top conduit access. The cabinet may be supported on a plurality of casters 210.

FIG. 4B shows maintenance bypass cabinet 200 having door 202 opened and attached to left-hand hinges 212, 214. Like the distribution cabinet described above, door 202 for maintenance bypass cabinet 200 opens 120 degrees. Hinges 212, 214 can set for either left or right hand opening of the door. Door 202 also removes for maintenance as shown in FIG. 4C.

In FIG. 4C, cabinet 200 has the door removed from hinges 212, 214. The exposed cabinet has a panel face 216. Panel face 216 includes a rotary bypass switch 218 and circuit breakers 220. To shut down the UPS for safe maintenance procedures, maintenance personnel may turn the rotary bypass switch 218. Top conduit plates 208 are split and straddle rotary switch 218. The divided plates 208 provide better top conduit access.

Depending on the requirement for an uninterruptible power supply for a particular installation among other factors, the maintenance bypass cabinet may have a number of configurations. FIG. 5A shows a frame 300 for a maintenance bypass cabinet. Frame 300 includes a bypass rotary switch 320 and maintenance bypass circuit breakers 330. Maintenance bypass breakers 330 mount vertically within frame 300 to provide access to connections from the top and bottom. Larger maintenance bypass cabinets may also include transformers 340. Bypass rotary switch 320, circuit breakers 330, and transformers 340 are all front accessible and serviceable for maintenance. Furthermore, maintenance bypass transformers 340 remove from the front of the cabinet. Frame 300 includes side bulkheads 310. One bulkhead 310 has a left side passage 312 for connection of wires (not shown) to an attached cabinet (not shown), such as an UPS cabinet.

Figure 5B:
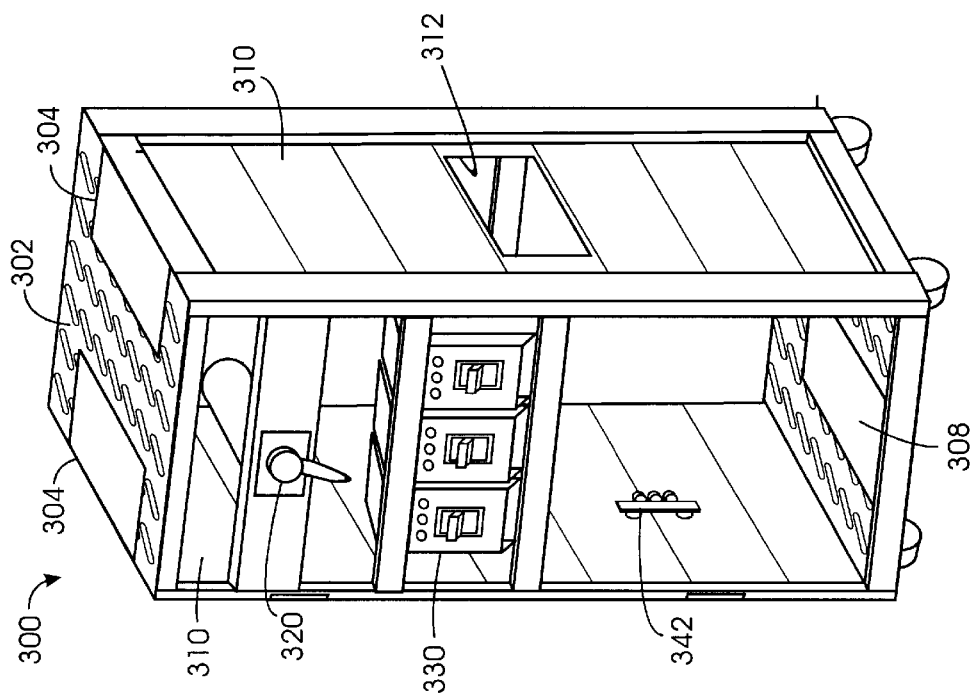
Figure 5A:
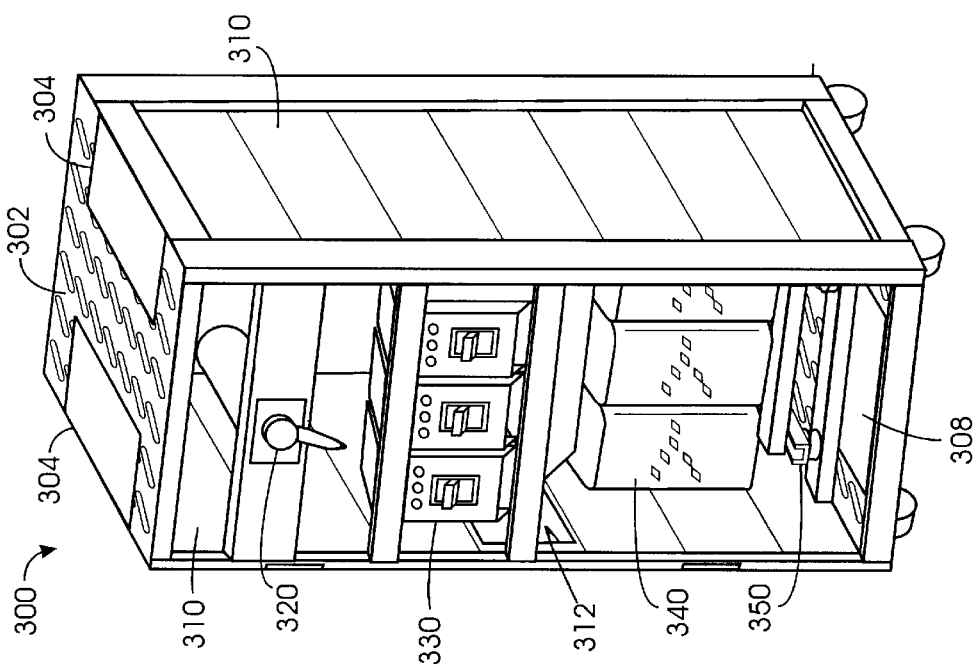

FIG. 5B shows another frame 300 of a maintenance bypass cabinet. Frame 300 includes a bypass rotary switch 320 and maintenance bypass circuit breakers 330. The present frame 300 also includes a chamber for terminal blocks 342. The terminal blocks mount to side bulkhead 310 to give more access to the bottom of the cabinet to pull wire. Bypass rotary switch 320 and circuit breakers 330 are front accessible and serviceable for maintenance. Frame 300 also has a right side passage 312 for connection of wires (not shown) to an attached cabinet (not shown), such as an UPS cabinet.

FIG. 5C shows another frame 300 for a maintenance bypass cabinet. Frame 300 includes a bypass rotary switch 320 and a chamber containing a plurality of terminal blocks 344. Terminal blocks 344 attach to side bulkhead 310 to allow greater access to the bottom of the cabinet.

FIG. 5D shows a detail of a mounting 350 for transformers in a maintenance bypass cabinet. Transformer 340 positions in a cabinet having a front corner post 306 and a back corner post 307. Two rails 360, 362 attach parallel and spaced apart on cabinet floor 308.

Two mountings as described herein are used to support transformer 340, but only one arrangement will be discussed. The mounting 350 includes spacers 370, 372 attached to rails 360, 362. The spacers may be composed of non-inductive material. A mounting bar 380 attaches to spacers 370, 372. Mounting bar 380 attaches by bolts through various elongated boltholes 382 at both ends of the bar to allow for adjustment.

Mounting bar 380 has a channel that sustains a sliding bar 385. Sliding bar 385 fits into the channel of mounting bar 380 and may move within the channel. In this way, sliding bar 385 can move from front to back of the cabinet. Sliding bar 385 includes elongated attachment boltholes 386 to attach the sliding bar to mounting bar 380.

Sliding bar 385 supports two transformer brackets 390. Transformer brackets 390 lie on sliding bar 385 and hold transformer 340. Brackets 390 run parallel to rails 360, 362 and are supported at another end by a similar mounting arrangement as described herein. Both transformer brackets 390 have a lower surface to support transformer 340 on the sliding and mounting bars and have a side surface for sandwiching transformer 340 between the brackets.

A bolt 394 connects both brackets 390 and holds them against transformer 340. Brackets 390 may also be provided with bolt holes 392 for using clamps or bolts to attach or hold transformer brackets on sliding bar 385 and mounting bar 380. Upper transformer brackets that mount and slide on guide bars may also hold transformer 340.

In use of the mounting 350 described herein, maintenance personnel detach bolts, if present, holding sliding bar 385 to mounting bar 380. Sliding bar 385 with transformer brackets 390 and transformer 340 move forward providing front access and serviceability to the transformers in a maintenance bypass cabinet. The mounting 350 also provides better access to mounting bolts at the rear of the cabinet.

Figure 6B:
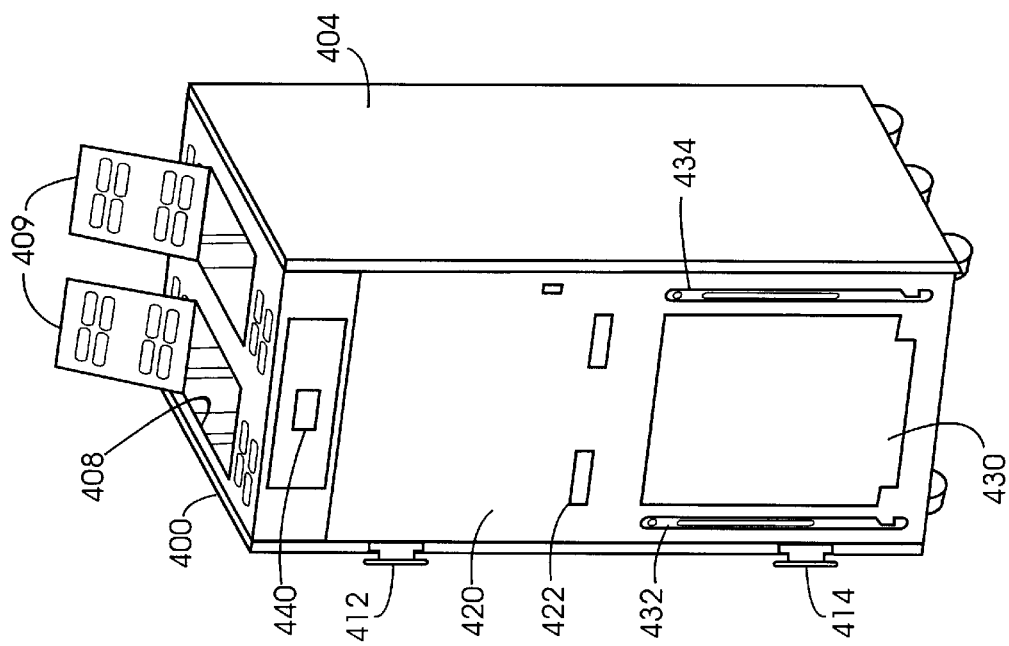
FIGS. 6A–B illustrate a battery cabinet according to the present invention.
Figure 6A:
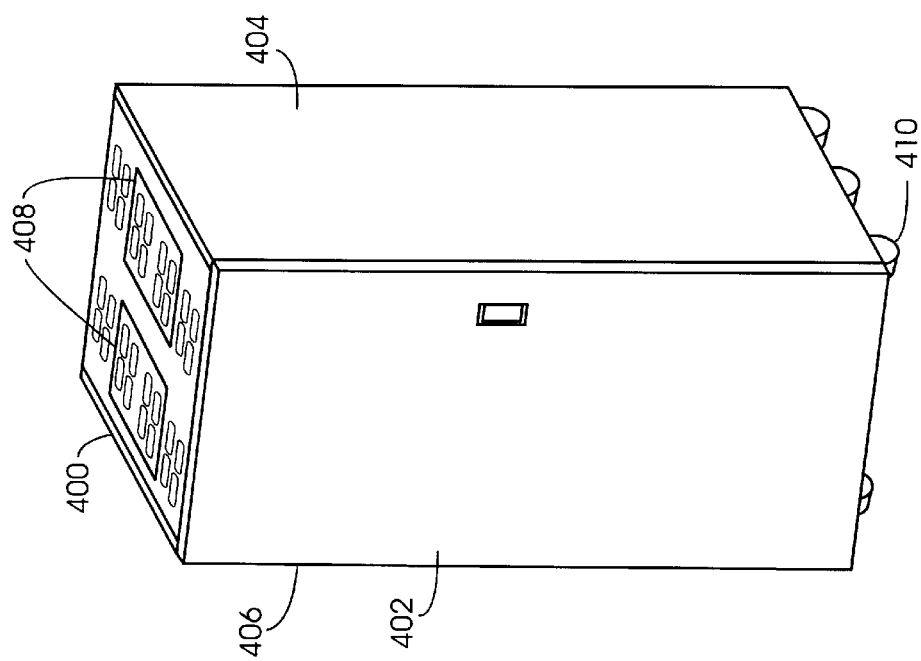

FIGS. 6A–B illustrate a battery cabinet according to the present invention. FIG. 6A illustrates battery cabinet 400 with a door 402 that opens to an angle of 120 degrees. Door 402 is reversible and can be hinged on either the left or right. Battery cabinet 400 has side panels 404 and 406 that reveal bulkheads for attachment to other cabinets (not shown). The bulkheads on sides 404, 406 are symmetric to facilitate the attachment of other cabinets. Battery cabinet 400 includes a vented ceiling with access doors 408 for performing maintenance to batteries contained in the top of the cabinet.

FIG. 6B illustrates an isometric view of battery cabinet 400 with door removed for maintenance. Battery cabinet 400 includes hinges 412 and 414 for attachment of the removed door. Hinges 412, 414 allow the door to be lifted off for maintenance procedures. In the vented ceiling, doors 409 on the two access openings 408 are shown open to gain access to top batteries of the cabinet.

The front of the cabinet has a safety barrier 420. Safety barrier 420 covers the battery bays and service trays (not shown). Safety barrier 420 includes a mounted service shelf 430 and support arms 432 and 434. Safety barrier 420 lifts from the front of cabinet 400 by handholds 422. Handholds 422 form a plastic cup that does not expose the fingers of maintenance personnel to the inside of the battery cabinet when removing the safety cover. In this way, personnel accessing the UPS battery cabinet 400 from the font of the unit will not be exposed to high voltage connections or components.

Battery cabinet 400 may include a motor operated breaker 440 that may provide overcurrent protection and manual disconnection of the battery cabinet to the UPS. Various cabinet sizes are possible having different numbers of service bays and batteries. Small cabinets may accommodate batteries to supply 30 to 100 kVA, while large cabinets may accommodate enough batteries to supply 30 to 130 kVA. Each battery is made up of individual cells. The cells making up the battery are ideally of the sealed valve regulated or other non-spillable type.

Any overcurrent or manual disconnection of the battery cabinet is accessible to maintenance personnel without their being exposed to hazardous battery voltage. All devices that require access as a normal part of operation or to disconnect the batteries when not operable from the outside of the cabinet have hinged covers. Batteries and wiring may be accessed through a panel or door held in place by a tool-operated fastener or by a lockable latch. All access for operation or service is made through the front only, so that the battery cabinet can be mounted against the wall with other cabinets mounted on each side.

Figure 7A:
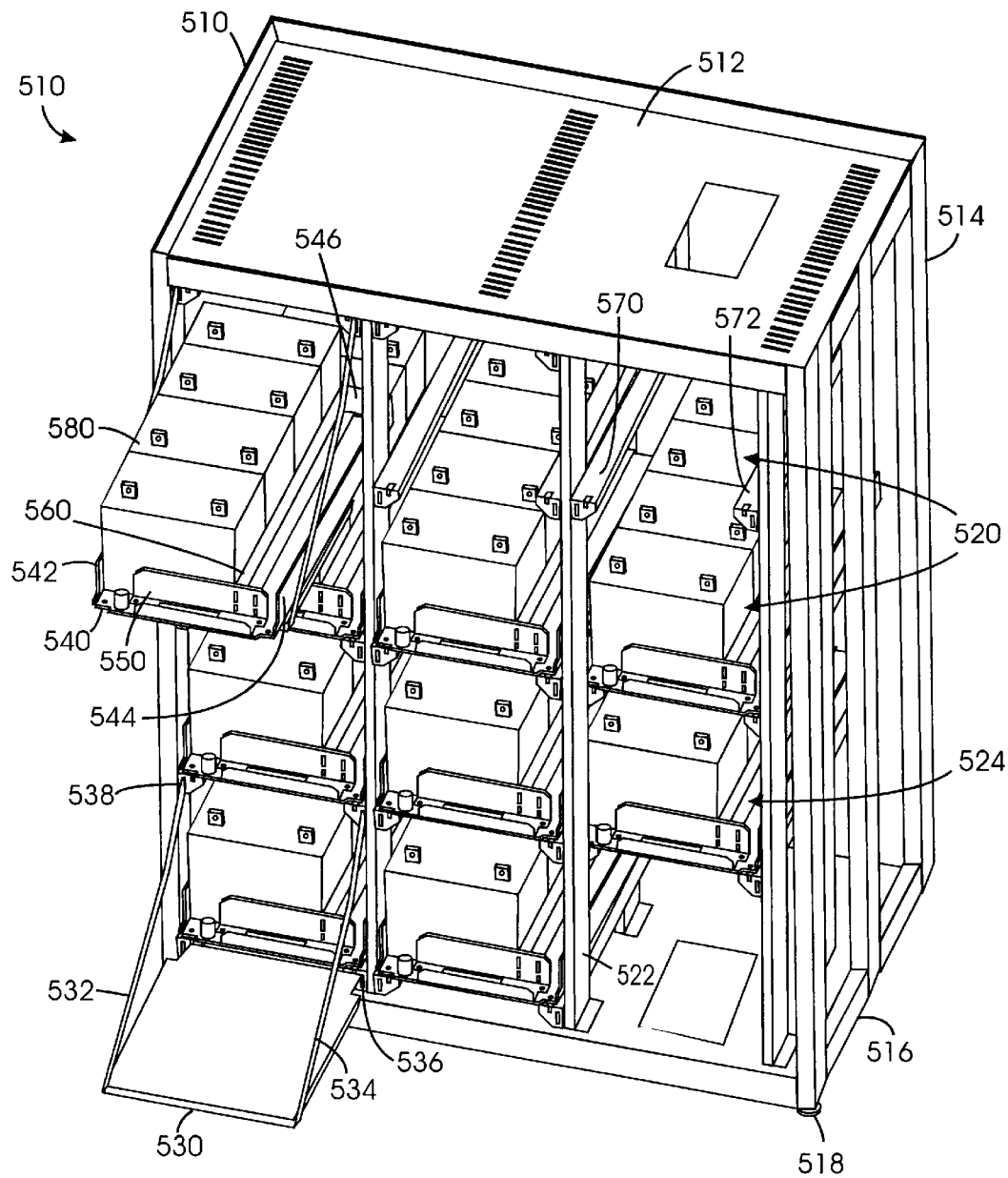
FIGS. 7A–B illustrate additional embodiments of a battery cabinet according to the present invention.

FIG. 7A illustrates an isometric view of a battery cabinet 500 for a UPS according to the present invention. Battery cabinet 500 has a frame 510 with a ceiling 512. A plurality of posts 514 attaches to base 516 and support ceiling 512. Base 516 has a plurality of stands 518 and/or casters (not shown) for support of the cabinet to a floor.

Frame 510 is constructed of formed steel members welded or mechanically fastened to withstand specific criteria for transportation and seismic event. The frame forms a single electrical entity that maintains continuity during the lifetime of the system. The frame is finished in a method that resists marring and corrosion when transported, stored and installed within suitable environmental limits.

The front face of frame 510 includes a plurality of battery tiers 520. For the present embodiment, frame 510 has an approximate width of 49 inches and may accommodate four battery tiers. A series of dividing posts 522 divide battery tiers 520 into a plurality of bays 524 in the face of the cabinet. In the present embodiment, each battery tier has three bays 524, making a total of up to twelve battery bays 524 for the battery cabinet.

Battery bays 524 of the cabinet may contain a service tray, such as service tray 540 shown removed from a bay. Service tray 540 has two sidewalls 542, 544 and a rear wall 546. The tray also has a bracket 550 that acts as an adjustable wall in the front of the service tray for holding a plurality of batteries 580. When the dimensions of the batteries 580 are not fully contained by the sidewalls 542, 544 and 546 of service tray 540, an auxiliary wall 560 acts as an adjustable wall for insuring that the batteries are held on the service tray. Two tray guides, such as tray guides 570, 572, support the service trays within the battery bays. The tray guides may include a slight decline towards the rear of the cabinet to prevent inadvertent sliding out of the tray.

To support the service trays 540 when removed from the service bays, a service shelf is used, such as service shelf 530 shown attached to the cabinet. Service shelf 530 attaches to the front of cabinet 510 when cleaning or service is required on batteries in a bay. Service shelf 530 attaches to shelf brackets 536 on the front ends of the tray guides 570, 572 that support the service tray in the bay. Service shelf 530 has two arms 532, 534 that attach to arm brackets 538 on the front ends of tray guides 570, 572 for additional support.

On-line maintenance may be performed periodically on the batteries and connections within the battery cabinet. On-line maintenance includes taking voltage measurements for each battery and temperature measurement for each connection. The measurements are taken with the battery cabinet on-line with the UPS. Dimensions of the bays allow for on-line service and measurement.

Service space requirements for the battery cabinet are based on the use of standard issue insulated tools utilizing standard length uninsulated sockets. Depth dimensions are based on the distance from the front of the frame to the battery terminals inside the bay. Voltage measurements require a special lengthened probe to come into contact with the battery terminal. Temperature measurements require different service access for contact and non-contact measurements. In some applications, a wider opening at the front of the battery tray results in less service height required.

The service space for the battery cabinet allows adequate access to the terminal hardware. The lugs used to connect wires to the terminals of the battery provide adequate space between the nut and either the frame or other terminal. For terminal posts that inset in the battery, the space above the batteries while in the bay may be approximately 4 inches from the top of the batteries to the shelf above. For terminal posts that project from the battery, the space above the batteries while in the bay may be between 3.5 inches to 5 inches from the top of the batteries to the shelf above.

Off-line maintenance may also be performed periodically or whenever a battery connection must be removed. Off-line maintenance includes the cleaning, application of anti-oxide compound, and retorquing of the battery connection, and installation or removal of monitoring hardware or sensing cables in addition to taking voltage and temperature measurements. This maintenance is performed with the battery cabinet off-line from the UPS.

To perform off-line maintenance with a service shelf 530 and service tray 540 as described above, maintenance personnel pull the service tray holding the batteries out of a bay and onto the attached service shelf. The service shelf allows the tray to slide almost all the way out of the battery bay. It is desired that the service tray meet guidelines defined by American Therapeutics due to the awkward position a user must pull the tray and the weight associated with the batteries. Some typical values for an initial and sustained pull that is made 57" off the floor include an initial and sustained force less than 21 kg (46 lbs.). Nylon runners may be used on the tray guides to meet these requirements. For the service trays to slide out, only cabling connected to the front most cell may be moved to allow the tray to be removed from the bay.

Using a slide out service tray and service shelf offers one way to perform off-line maintenance. The service tray allows the service tray to slide almost all the way out of the battery bay. The use of a service shelf may not be recommended for larger batteries due to the weight of the batteries, such as batteries weighing in excess of 100 lbs. each. To remove a battery from the cabinet requires no more than the removal of the hold down devices, the service tray on which the battery is mounted, or other batteries on the same tray. If lifting equipment is required to remove a failed battery, the servicing space may be met by having the service tray pulled onto the service shelf.

Figure 7B:
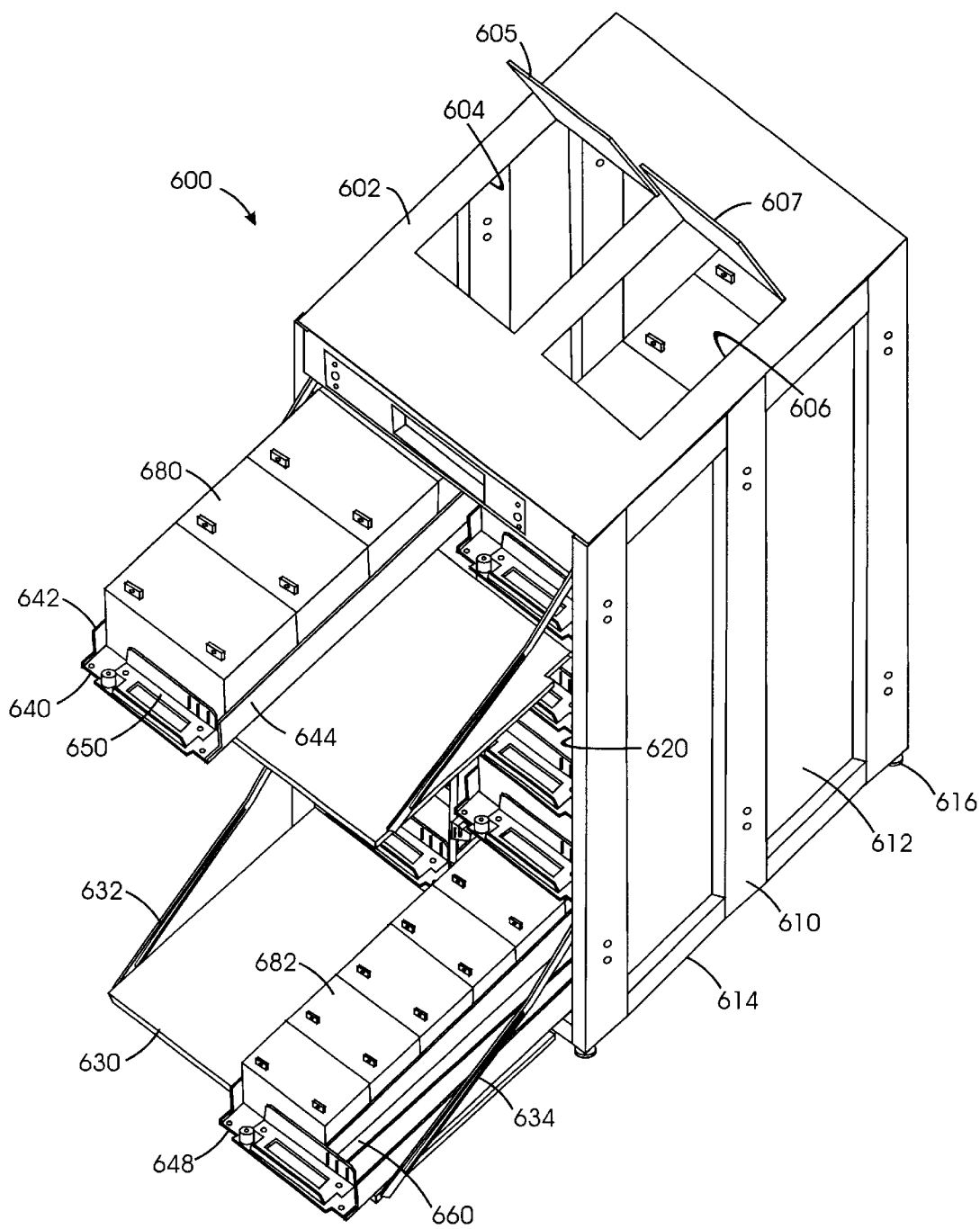

FIG. 7B illustrates another embodiment of a battery cabinet for an uninterrupted power supply (UPS) according to the present invention. FIG. 7B illustrates an isometric view of a battery cabinet 600. Battery cabinet 600 has a ceiling 602. Two access openings 604, 606 lie in ceiling 602 for gaining access to top batteries. The access openings 604, 606 each have an access door 605, 607, shown open in FIG. 3A. A plurality of posts 660 and sidewalls 662 support the ceiling 602 to a base 664. Base 664 has a plurality of stands 666 and/or casters (not shown) for support of the cabinet to a floor.

The front face of battery cabinet 600 includes a plurality of battery tiers 620. For the present embodiment, battery cabinet 600 has an approximate width of 25 inches and may accommodate five battery tiers. Battery tiers 620 may include dividing shelves (not shown) that separate the battery tiers from one another. A dividing posts 624 divides battery tiers 620 into a plurality of bays 626 in the face of cabinet 600. In the present embodiment, each battery tier 620 has two bays 626, making a total of up to ten battery bays 626 for battery cabinet 600.

Battery bays 626 of the cabinet may contain a service tray, such as service tray 640 shown removed from its battery bay. Service tray 640 has two sidewalls 642, 644 and a rear wall (not shown). The tray also has an adjustable bracket 650 at the front of the tray. The walls of the tray and bracket 650 hold a plurality of batteries 680 on service tray 640. Tray guides (not shown) support the service trays 640 within the battery bays 626.

Service tray 648 is also shown removed from its bay. Service tray 648 has an auxiliary wall 660 to hold batteries 682 on the tray. Batteries 682 are smaller than batteries 680 on service tray 640. For this reason, auxiliary wall 660 is used.

To support the service trays when removed from their bays, service shelf 630 attaches to the front of cabinet 600 when cleaning or service is required on the batteries in a bay. Service shelf 630 attaches to shelf brackets (not shown) on the front ends of tray guides, such as described earlier, which support the service trays in the bays. Service shelf 630 has two arms 632, 634 that attach to arm brackets (not shown) also on the front ends of tray guides. The arms 632, 634 attach for additional support. In the present embodiment, service shelf 630 can accommodate two service trays from adjacent bays.

Figure 8:
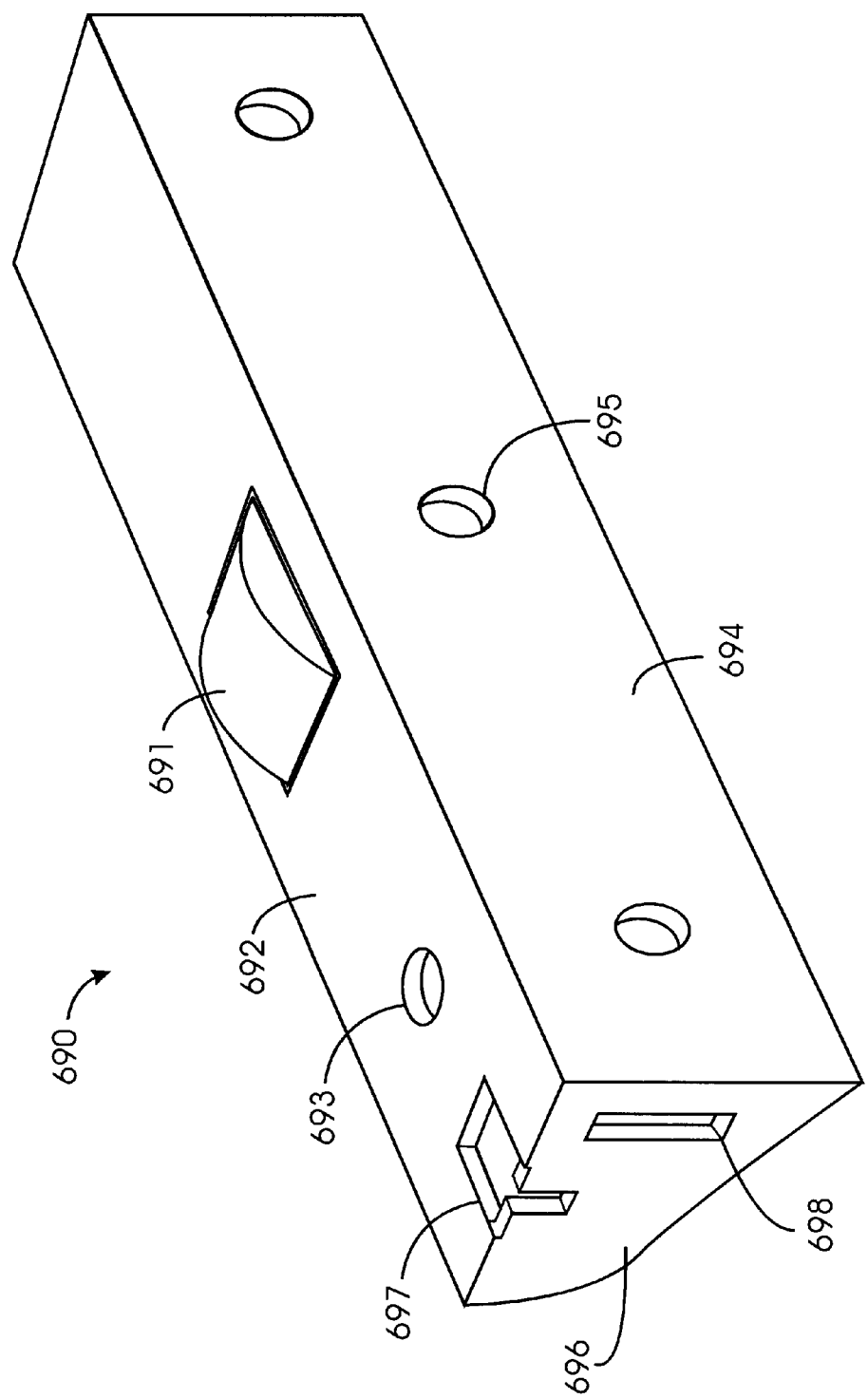
FIG. 8 illustrates an embodiment of a tray guide according to the present invention.

FIG. 8 illustrates an embodiment of a tray guide 690 according to the present invention. Tray guide 690 defines an elongated L-bracket having a top face 692 and a side face 694. Top face 692 supports a service tray (not shown) when in a bay of a battery cabinet. Top face 692 has a boltole 693 for securing the service tray to the tray guide when installed in the bay. Top face 692 may have a plurality of nylon rollers or runners, such as roller 691, to help movement of the service tray on tray guide 690. Side face 694 attaches tray guide 690 within the bay of the cabinet. A plurality of boltholes 695 may attach the tray guide within the bay.

A gusset or bracket end 696 connects top face 692 and side face 694 at the front of tray guide 690. Bracket end 696, along with part of top face 692, provide an attachment slot 697. Complimentary protrusions on a service tray (not shown) fit into attachment slot 697 for support of the service tray. Bracket end 696 also contains an attachment slot 698. The end of a shelf arm (not shown) that supports a service tray fits into attachment slot 698 for support of the service tray.

Attachment slots 697 and 698 may have a variety of configurations. The present embodiment of tray guide 690 shows attachment slots 697 as having a wider insertion portion and a less wide retention portion. The form of slot depicted is suitable for a tap having a wide, flat head and a thinner body attached to the object to the held by the slot. The present embodiment of tray guide 690 shows attachment slots 698 as being a thin slit, suitable for insertion of a thin end of an arm having a hook. Details concerning the present embodiments of attachment slots and equivalent forms of slots fall within the capabilities of one of ordinary skill in the art.

FIGS. 9A–B illustrate an embodiment of a service tray holding batteries of various sizes. FIG. 9A shows service tray 700 holding four batteries. Each of the batteries has exemplary dimensions of 10.26 inches wide, 6.83 inches deep and 8.78 inches high. Service tray 700 has two sidewalls 702, 704 and a rear wall 706. The three walls 702–706 retain the batteries 720.

A battery bracket 710 holds the batteries 720 at the front of the tray. Battery bracket 710 has a battery wall 712 with a plurality of slots 714. Detail of slots 713, 714, 715 are provided below. Bracket 710 also includes a handle 718 for maintenance personnel to grip when pulling the service tray from a battery bay for service of the batteries. Bracket 710 mounts to the service tray by adjustment hole 716. A bolt or screw (not shown) inserts through the adjustment holes 716 and thread into corresponding holes in the service tray. Bracket 710 can be properly adjusted to hold the plurality of batteries on the tray.

Service tray 700 includes two boltholes 708 for attachment of service tray 700 to the tray guides as shown in FIG. 8. Maintenance personnel must unbolt the service tray from the tray guides before pulling the tray out of a bay in the cabinet.

Internal power conductors (not shown) that attach to terminals 722 or other components (not shown) of the cabinet may be tin plated copper bus bar or cable. Bolted connections use plated or stainless steel hardware installed to require minimal maintenance. Anti-corrosion compound may be applied to connections of dissimilar metals in the electrical current path. Cables (not shown) connect to mechanical lugs as advised by the manufacturer and may not loosen during transportation of the cabinet.

The sizing of the conductors within the battery cabinet is based on the ampicity of the overcurrent device installed in the cabinet. If no overcurrent device is provided, the conductors may be based on a battery discharge rate of one minute to 1.67 volts per cell. The conductors may have mechanical support independent of the battery terminals except for those conductors connected directly between adjacent batteries on the same tray. Mechanical support may not use pressure sensitive adhesives.

FIG. 9B shows service tray 700 holding four batteries 760. Each of the batteries has the exemplary dimensions of 8.99 inches wide, 5.47 inches deep and 8.84 inches high. Service tray 700 has two sidewalls 702, 704 and a rear wall 706. Rear wall 706 in the present embodiment raises higher than the other walls 732, 734 and provides additional support to batteries 760, especially when an maintenance personnel pull service tray 700 from a bay.

A battery bracket 710 holds the batteries 760 at the front of the tray. Battery bracket 710 has a battery wall 712 with a plurality of slots 715. Rear wall 706 and bracket 710 hold batteries 760. Sidewall 732 and an auxiliary wall 750 properly retain batteries 760 on the sides of the pack.

Auxiliary wall 750 defines a long L-bracket with ends fitting into a slot 715 in the bracket 710 and a slot (not shown) in rear wall 706. Using slots, such as 715, on adjustable bracket 710 and rear wall 706 along with an adjustable auxiliary wall 750 allows service tray 700 to accommodate various sized batteries.

Having thus described the present invention, it is understood that various alterations, modification, and improvements will readily occur to those skilled in the art. Such alterations, modifications and improvements, though not expressly described above, are nonetheless intended and implied to be within the scope of the invention. Accordingly, the foregoing discussion is intended to be illustrative only; the invention is limited and defined by the following claims and equivalents thereto.

What is claimed is:

1. A system of ancillary cabinets for attaching to a first cabinet having electrical equipment and a first wiring trough, the system comprising: one or more ancillary cabinets, each comprising: a frame having a first side, a second side, and a front side, either the first side or the second side being attachable to a side of the first cabinet, a bulkhead disposed on the first or second side and defining a second wiring trough aligning with the first wiring trough of the first cabinet; and a door reversibly and removably attachable to the front side of the frame.

2. The system of claim 1, wherein the first and second sides each have a depth and a height matching a dept and a height of the side of the first cabinet.

3. The system of claim 2, wherein the first and second sides each comprise one or more posts, the one or more posts having one or more fastener holes aligning with fastener holes in posts of the first cabinet.

4. The system of claim 1, wherein the first cabinet houses an uninterruptible power supply and wherein the one or more ancillary cabinets house a maintenance bypass switch, batteries or distribution equipment.

5. The system of claim 1, wherein the front side defines symmetrically arranged openings allowing the one or more ancillary cabinets to attach in a reversed or inverted arrangement on the first cabinet.

6. The system of claim 5, wherein the frame comprises a third side adjacent the front side and defining symmetrically arranged openings allowing wiring to connect in more than one arrangement with the ancillary cabinet.

7. A battery cabinet comprising:
at least one bay in the battery cabinet;
at least one guide attached in the bay;
a tray supported on the at least one guide; and
an adjustable service shelf attachable to the battery cabinet and supporting the tray when removed from the bay.

8. The battery cabinet of claim 7, wherein the tray comprises a plurality of walls for holding one or more batteries.

9. The battery cabinet of claim 8, wherein the tray comprises an adjustable battery bracket attachable to the tray to hold one or more batteries.

10. The battery cabinet of claim 9, wherein the tray comprises an auxiliary wall adjustably attachable to the fray to bold a side of one or more batteries.

11. The battery cabinet of claim 7, wherein the service shelf attaches to an end of the at least one guide at a front of the bay.

12. The battery cabinet of claim 11, wherein the service shelf further comprises an arm attaching to the battery cabinet to support the service shelf.

13. The battery cabinet of claim 12, wherein the arm attaches to an end of another guide at a front of another battery bay.

14. The battery cabinet of claim 7, wherein the at least one guide further comprises a roller or runner to slide the tray in or out of the bay.

15. The battery cabinet of claim 14, wherein the at least one guide further comprises a rearward slant from a front of the bay to prevent inadvertent egress of the way from the bay.

16. The battery cabinet of claim 15, wherein the at least one guide further defines a fastener hole to secure the tray when installed in the bay.

17. The battery cabinet of claim 7, wherein the battery cabinet comprises: a first side, a second side, and a front side adjacent the first and second sides, the first and second sides having a depth, and a height matching a depth and a height of a side of another cabinet, the first or second side being attachable to the side of the other cabinet; a first wiring trough defined in the first or second side of the battery cabinet and aligning with a second wiring trough defined in the other cabinet; and a door reversibly and removably attachable to the front side.

18. A battery cabinet comprising:
at least one bay in the battery cabinet;
a tray supported in the bay; and
an adjustable service shelf attachable to the battery cabinet and supporting the tray when removed from the bay.

19. The battery cabinet of claim 18, wherein the tray comprises a plurality of walls for holding one or more batteries.

20. The battery cabinet of claim 19, wherein the tray comprises an adjustable battery bracket attachable to the tray to hold one or more batteries.

21. The battery cabinet of claim 20, wherein the tray comprises an auxiliary wall adjustably attachable to the tray to hold a side of one or more batteries.

22. The battery cabinet of claim 18, wherein the service shelf attaches at a front of the bay.

23. The battery cabinet of claim 22, wherein the service shelf further comprises an arm attaching to the battery cabinet to support the service shelf.

24. The battery cabinet of claim 23, wherein the arm attaches at a front of another battery bay.

25. The battery cabinet of claim 18, further comprising at least one guide supporting the tray in the bay.

26. The battery cabinet of claim 25, wherein the at least one guide further comprises a roller or runner to slide the tray in or out of the bay.

27. The battery cabinet of claim 26, wherein the at least one guide further defines a fastener hole to secure the tray when installed in the bay.

28. The battery cabinet of claim 18, wherein the battery cabinet comprises: a fist side, a second side, and a front side adjacent the first and second sides, the first and second sides having a depth and a height matching a depth and a height of a side of another cabinet, the first or second side being attachable to the side of the other cabinet; a first wiring trough defined in the first or second side of the battery cabinet and aligning with a second wiring trough defined in the other cabinet; and a door reversibly and removably attachable to the front side.

* * * * *

UNITED STATES PATENT AND TRADEMARK OFFICE
CERTIFICATE OF CORRECTION

PATENT NO.    : 6,563,048 B2
DATED         : May 13, 2003
INVENTOR(S)   : David Holt, Kenneth M. Wagner and James K. Martin It is certified that error appears in the above-identified patent and that said Letters Patent is hereby corrected as shown below:

Column 11,
Line 39, delete "fray" and insert -- tray --
Line 40, delete "bold" and insert -- hold --
Line 55, delete "way" and insert -- tray --

Column 12,
Line 46, delete "fist" and insert -- first --

Signed and Sealed this

Twenty-first Day of October, 2003

JAMES E. ROGAN
*Director of the United States Patent and Trademark Office*